United States Patent [19]

Nutter

[11] 4,304,738

[45] Dec. 8, 1981

[54] PACKING MATERIAL AND APPARATUS

[76] Inventor: Dale E. Nutter, 7935 S. New Haven St., Tulsa, Okla. 74136

[21] Appl. No.: 85,169

[22] Filed: Oct. 15, 1979

[51] Int. Cl.³ ............................................. B01F 3/04
[52] U.S. Cl. .................................... 261/94; 261/113; 261/114 R; 261/DIG. 72
[58] Field of Search .................................. 261/94–98, 261/113, 114 R, DIG. 26, DIG. 72; 55/489, 525; 202/158

[56] References Cited

U.S. PATENT DOCUMENTS

| | | | |
|---|---|---|---|
| 2,037,164 | 4/1936 | Harrah | 55/489 |
| 2,493,726 | 1/1950 | O'Day | 55/489 X |
| 2,568,749 | 9/1951 | Kittel | 261/113 |
| 2,767,967 | 10/1956 | Hutchinson | 261/113 |
| 3,285,587 | 11/1966 | Huber | 261/96 |
| 3,286,992 | 11/1966 | Armeniades et al. | 261/DIG. 26 |
| 3,887,665 | 6/1975 | Mix et al. | 261/94 X |
| 3,927,165 | 12/1975 | Grochol et al. | 55/521 X |
| 4,105,723 | 8/1978 | Mix | 261/114 R X |

FOREIGN PATENT DOCUMENTS

| | | | |
|---|---|---|---|
| 253606 | 6/1926 | United Kingdom | 55/525 |
| 427087 | 4/1935 | United Kingdom | 261/94 |
| 607288 | 8/1948 | United Kingdom . | |
| 734874 | 8/1955 | United Kingdom | 261/94 |
| 942536 | 11/1963 | United Kingdom . | |
| 977752 | 12/1964 | United Kingdom | 261/94 |

*Primary Examiner*—Richard L. Chiesa
*Attorney, Agent, or Firm*—Beveridge, DeGrandi, Kline & Lunsford

[57] ABSTRACT

Packing material is formed of stacked panels of expanded metal, each of which has intersecting sets of parallel linear metal strips. Each panel has a horizontal set of linear strips oriented parallel to a corresponding set of linear strips on an adjacent panel and perpendicular to a vertical fluid flow direction which is parallel to the panels; and, each panel has a second set of linear strips inclined about 45° from the vertical in a direction opposite to the inclination of the corresponding inclined set of strips on the adjacent panel. The strips of adjacent panels are canted in opposite directions relative to the planes of their respective panels. Alternative orientations and directions are also disclosed. The packing material is used in packed towers and conduit-connected motionless mixers, and with crossflow trays and dualflow trays. A dualflow fluid contact device is disclosed, wherein the liquid bed on each dualflow tray is stabilized by partially or totally immersing a packing material in the liquid bed.

29 Claims, 9 Drawing Figures

U.S. Patent    Dec. 8, 1981    Sheet 1 of 2    4,304,738
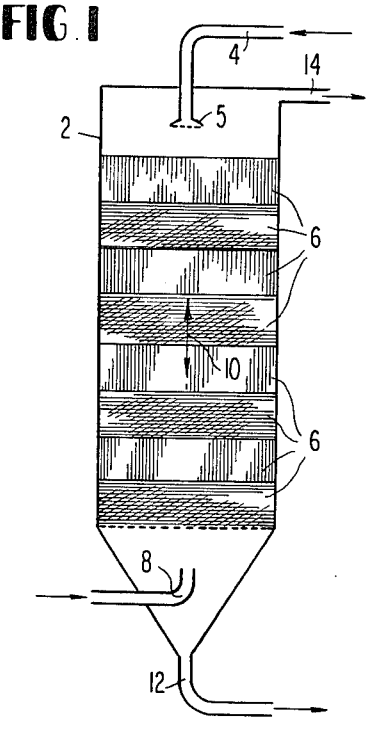
FIG.1
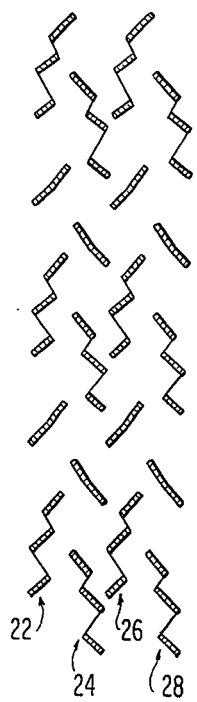
FIG.3
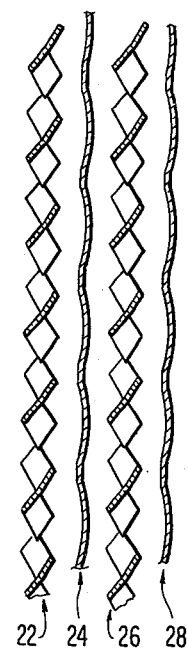
FIG.4
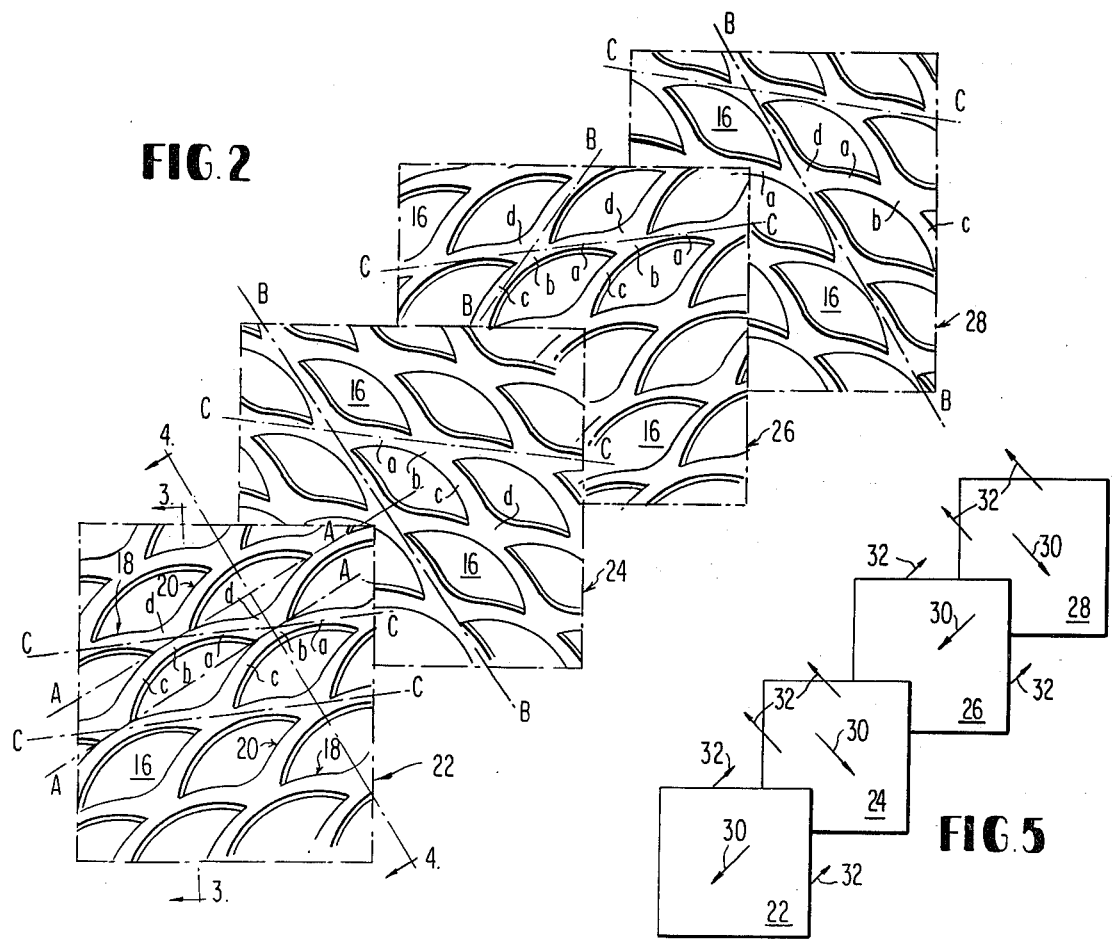
FIG.2
FIG.5

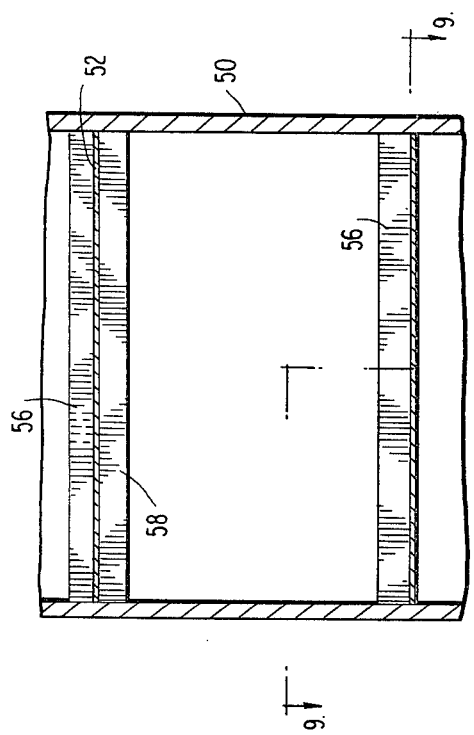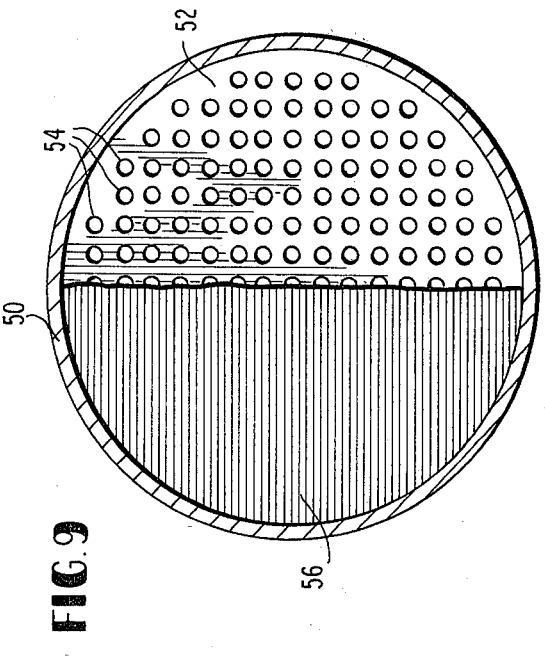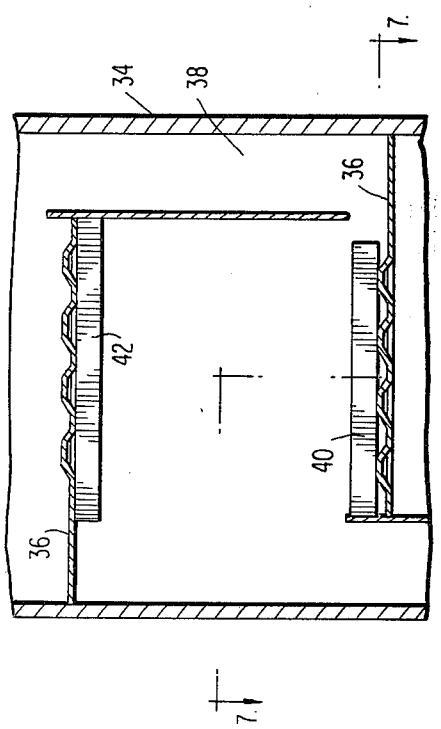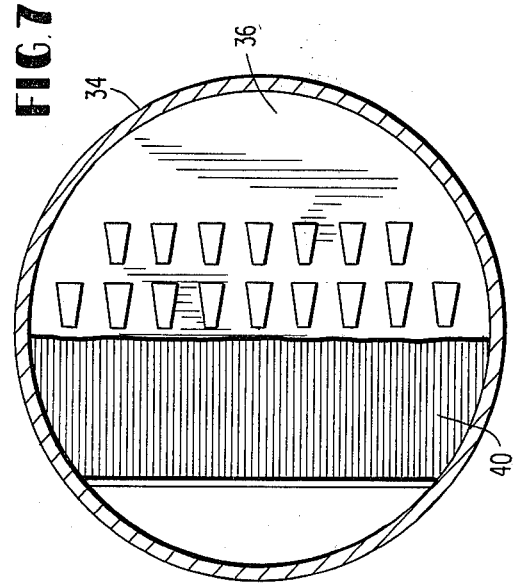

PACKING MATERIAL AND APPARATUS

BACKGROUND OF THE INVENTION

This invention relates to improved packing materials for gas-liquid contacting in packed towers, cross flow tray columns, motionless mixers and like apparatus.

Chemical processing apparatus frequently includes towers filled with a packing material which provides many liquid-supporting surfaces. Liquid introduced at the upper end of the tower flows downwardly as a thin film on the surfaces of the packing material. Gaseous vapors are injected into the lower end of the tower and ascend through spaces in the packing material, moving through the tower in intimate contact with the liquid film on the surface of the packing. The contact between the liquid and vapor can produce a variety of effects such as mass transfer, chemical reactions, heat exchange and scrubbing or deentrainment.

Considerable efforts have been devoted to the development of packing materials which provide a reasonable latitude of gas and liquid throughput, a high mass transfer rate and a low pressure drop. Random packings formed of loose rings, cylinders or saddles are commonly used; and, packings of preformed sections which extend the full transverse extent of the tower have been developed as exemplified by U.S. Pat. Nos. 3,285,587 and 3,927,165.

There have been some efforts to develop packing materials which, like the present invention, are formed of parallel sheets of expanded sheet material such as expanded metal. Such sheets are manufactured by forming staggered parallel rows of longitudinally aligned slits in a flat continuous sheet of metal and then deforming the sheet to lengthen it transversely of the openings and open the slits to create diamond or almond-shaped openings. The openings are disposed in rows which angularly intersect. The strips of metal between the openings become canted relative to the plane of the panel, and they take on an undulating configuration. Each strip may be regarded as having successively arranged sets of four segments, in which the first and third segments define the edges of the openings and the second and fourth segments are connected to the opposite segments on the adjacent strips. Segments of the undulating strips are aligned to form two intersecting sets of parallel linear strips which lie between and define the angularly intersecting rows of openings.

British Pat. Specification No. 427,087 discloses a scrubber formed of a stack of sheets of expanded metal, preferably vertically disposed with the short lengths of the diamond shaped openings of successive sheets being oriented so that one sheet has its short mesh vertical, the next sheet has its long mesh vertical, the next sheet is reversed and has its short mesh vertical, and the next sheet is reversed and has its long mesh vertical.

British Pat. Specification 977,752 of 1964 discloses a packed tower in which stacks of expanded metal sheets have their stretching directions alternately horizontal and vertical. The planes of the panels in alternate layers lie at right angles to the planes of the panels in the other layers. A panel which directs liquid droplets toward the vertical central plane is situated next to a panel which causes the droplets to travel more toward the center of the tower.

British Pat. Specification No. 734,874 of 1955 relates to a tower packing formed of layers of expanded metal sheets which are somewhat nested and oriented so that the inclined webs in one layer are oppositely inclined to those in the adjacent layer, thereby producing a louver effect on the gas which flows in a general direction perpendicular to the layers.

Although the foregoing discussion has dealt primarily with packed towers, it is believed that the invention is also suitable for use in connection with cross flow tray systems such as those shown in U.S. Pat. No. 4,105,723, conduit-connected motionless mixers of the genre exemplified by U.S. Pat. No. 3,286,992 and other types of apparatus.

The invention also relates to dualflow tray devices wherein liquid descends and vapor ascends through the same apertures which collectively provide an open area no greater than about 40% of the total tray area. Heretofore, dualflow type trays in large diameter columns have been found to be unsatisfactory due to instabilities in the liquid bed.

SUMMARY OF THE INVENTION

According to the present invention, sheets of expanded sheet material are stacked and disposed relatively to each other or relative to the fluid flow direction in a manner which is theorized to improve the dispersion, contact efficiency, mixing or coalescence of fluids passing through the stack of panels. In one respect, the invention is characterized as a stack of panels in which adjacent panels have sets of linear strips oriented parallel to each other and other sets of linear strips angularly disposed relative to each other. In another respect, the invention involves a stack of panels in which the respective linear strips of a given panel are oriented to lie both substantially parallel and substantially perpendicular to the linear strips of the panels adjacent thereto.

The invention also involves a stack of panels arranged so that a first panel has a series of linear strips which are inclined a given angle from the vertical in one direction, and a second panel which lies adjacent to the first panel and has its series of linear strips inclined from the vertical an equal angle but in an opposite direction. Further, the invention involves fluid contacting apparatus which includes packing material in the path of fluid moving in a generally axial direction, wherein a first panel has a series of the linear strips inclined a given angle in one direction from the axial direction, and a second panel adjacent to the first panel has its linear strips inclined by the given angle from the axial direction in an opposite direction. Preferably, the orientation of the linear strips in the packing is related to the flow path of fluid through the packing so that each panel has a series of linear strips which are oriented about 90° relative to each other and about 45° relative to the axial flow direction through the packing material. The axial flow direction is preferably vertical as is the case in conventional packed columns or towers.

The invention also pertains to improvements that this type of packing provides when used in conjunction with crossflow type tray devices.

Apart from the specific configuration of the packing material, this invention pertains to improvements in dualflow type tray devices. Dualflow columns have vertically spaced aperture trays with open areas no greater than about 40%; and, all of the liquid flows downwardly and all the vapor flows upwardly through the same tray apertures. The improvement to such columns involves the presence and use of a fluid contact packing material which is immersed in the liquid on each of the trays.

Although the invention may take a wide variety of configurations, preferred embodiments thereof are disclosed in the following description and are shown in the accompanying drawings.

DESCRIPTION OF THE DRAWINGS

FIG. 1 is a schematic view showing a packed tower containing stacked sections of the packing material of the invention.

FIG. 2 is an exploded view of small segments of four successive panels in the stack, showing their relative orientations.

FIG. 3 is a sectional view as seen along the line 3—3 of FIG. 2, showing the panels slightly spaced apart from the mutually contacting, adjacent stacked relationship they occupy during normal use.

FIG. 4 is a sectional view as seen along the line 4—4 of FIG. 2, showing the panels slightly spaced apart from their normal mutually contacting stacked relationship.

FIG. 5 is a diagrammatic representation of the preferential directions of liquid and vapor flow produced by the panels of FIGS. 2-4.

FIG. 6 shows the packing material in a crossflow tray apparatus, wherein some sections of the packing lie in the liquid on the tray deck and other sections of the packing lie below the succeeding tray in the vapor flow path to act as coalescing or deentrainment devices.

FIG. 7 is a sectional view as seen along the line 7—7 in FIG. 6.

FIG. 8 is a vertical sectional view of a portion of a dualflow tray system wherein a packing material is located in the liquid bed on each tray for stabilization.

FIG. 9 is a horizontal sectional view as seen along the line 9—9 of FIG. 8.

BRIEF DESCRIPTION OF A PREFERRED EMBODIMENT

FIG. 1 shows a packed tower which includes a vertical cylindrical shell 2 and a liquid inlet pipe 4 with a spray head 5 or other distribution device, uniformly introducing liquid into stacked sections 6 of the packing material of this invention. While passing through the packing, the liquid is contacted by and subjected to the distributive action of ascending vapors which are introduced into the lower end of the tower shell 2 by the vapor inlet pipe 8. The liquid and vapor move axially through the packing in countercurrent vertical flow paths indicated by the arrow 10 and, after passing through the tower, liquid is withdrawn through drain pipe 12 and vapor is withdrawn through vapor exhaust pipe 14.

Each section 6 of packing in the tower is formed of a stack of panels which are arranged in face-to-face vertical disposition, substantially parallel to the axial flow paths of fluids in the tower. Each panel has an appropriate length and orientation to provide its section 6 with a cylindrical configuration to fit the tower. Each section has a height of about four to six inches. To reduce the possibility of channelling, the panels in adjacent sections are turned relative to each other so that they lie in intersecting vertical planes. With this disposition, which is preferably perpendicular, any sheet-like flow released from one section 6 will not conform to the mechanical configuration of the packing it confronts in the succeeding section.

Each panel is a sheet of expanded sheet material, preferably formed of steel or other metal. As shown in FIG. 2, such sheets are formed of a series of canted, undulating strips which are interconnected at spaced locations to form openings 16 therebetween. Small portions of four typical panels are shown in FIG. 2, where one such undulating strip lies between the two lines A—A. Each undulating strip has successively arranged sets of successively arranged segments a, b, c and d, of which segments b and d are connected to an adjacent undulating strip. The panel is fabricated with a die set which shears and then draws segments a, b and c away from segments a, d and c. During this fabrication, the segment d is drawn slightly, forming a small angle with segment b. The segments a and c lie at obtuse angles relative to each other, measured in the plane of the panel and, together with exposed edges of segments b and d, they define the edges of the openings 16. The openings 16 are arranged in intersecting rows which lie respectively between the lines B—B and C—C. Between and parallel to these rows of openings 16 are sets of linear strips 18 and 20 which extend respectively along the intersecting lines B—B and C—C. Strips 18 are formed of segments a, b and d; and, strips 20 are formed of segments b, c and d. On each panel, all strips 18 are parallel to each other, as are all strips 20.

The four panels in FIG. 2 are designated 22, 24, 26 and 28. At the preferred panel orientation, the linear strips 18 of all panels are horizontal, parallel to each other and perpendicular to the axial fluid flow path. The strips 20 of adjacent panels are substantially perpendicular to each other and they lie at equal and opposite inclinations of about 45° relative to the vertical axial fluid flow path.

As may be seen in FIGS. 2 and 3, the surfaces of the segments a, b, c and d are canted relative to the vertical axial fluid flow path. These surfaces of adjacent panels are canted in opposite directions relative to the planes of their respective panels as shown in FIG. 3. It is evident in FIG. 3 that panels 22 and 26 will deflect ascending vapors to the right and panels 24 and 28 will deflect such vapors to the left so that the vapors will be dispersed laterally into the facing areas of adjacent panels. The vapor velocity vectors also have opposite components measured parallel to the panels, as can be seen in FIG. 2 where segments a and c of panels 22 and 26 will deflect the ascending vapors to the right; and, the segments a and c on panels 24 and 28 will deflect the vapors to the left. From the vantage point of FIG. 2, the panels 22 and 26 will also deflect the vapors away from the viewer, and the segments of panels 24 and 28 will deflect the vapors toward the viewer.

The edges of segments b and d project from the opposite faces of the panels. The projections formed by segments b are somewhat higher than the projections formed by segments d due to the configuration and operation of the manufacturing dies. These spaced projections are aligned to form ridges along the opposite faces of the panels. The primary ridges of this type, i.e. those which display the greatest valley-to-peak height, lie parallel to lines A—A of their respective panels. The projections are also disposed to form secondary ridges of lesser height, observable by sighting along the lines B—B and C—C.

FIG. 4 shows the profiles of the assembled panels 22, 24, 26 and 28, as seen when looking parallel to the undulating strips, at section line 4—4 in FIG. 2. It will be noted that the ridges on opposite sides of each panel are not of equal height, the ridges formed by the edges of segments d being somewhat flatter than the ridges formed by the edges of segments b. When the pack is assembled, the primary ridges which lie parallel to A—A are oriented substantially perpendicular to the corresponding ridges of the adjacent panels. These ridge dispositions tend to prevent the panels from sliding relative to each other when they are bound together. The secondary ridges which lie parallel to C—C of one panel are parallel to and project between the corresponding secondary ridges of an adjacent panel.

Each two panels with segments d facing each other will lie closer together than two panels with the segments b facing each other. This could cause the liquid and vapor to favor the larger space provided by segments b, but this effect may be counteracted by segments a and c which are oriented to direct the vapor into the narrower between-panel spaces where segments d contact each other. The liquid could favor the narrower spaces because they provide a greater surface-to-volume ratio. If unwanted channelling effects are experienced in the respective sections of the packing, this can be averted by reducing the height of the sections.

One suitable expanded metal panel, formed of a sheet about 1 mm thick, had an overall thickness of about 5 mm. The undulating strips were about 3.5 mm wide. The apertures 16 between two such strips were spaced apart about 8 mm; and, the individual apertures had a length of about 23 mm and a width of about 8 mm. Either the length of the openings 16 or, preferably, the width of the linear strips 18, 20 may be changed to vary the surface area per unit of packing volume for different system applications.

The net effect of the improved packing in a tower is that the liquid on adjacent panels will tend to move downwardly in opposite mutually perpendicular inclined directions, and the ascending vapor will move upwardly in opposite mutually perpendicular inclined directions. The vapor from adjacent panels will have opposite left/right components and opposite inward/outward components relative to the page in FIG. 2. This is illustrated in FIG. 5 where a film of descending liquid will tend to flow parallel to the panels in the direction of arrows 30, established by the orientation of the linear strips 20 shown in FIG. 2. The ascending vapors strike the canted surfaces of the panels and are deflected in the directions of arrows 32. From the vantage point of FIG. 5, the vapors are deflected rearwardly to the right by panels 22 and 26, and they are deflected forwardly to the left by panels 24 and 28. The alternate vapor deflection pattern will produce lateral dispersion with turbulence and shearing effects that will enhance interfaeial contact between the liquid and vapor.

The packing material of this invention may be useful in connection with a variety of fluid contacting systems other than the vertical packed tower or column described above. For example, it may be substituted for the plate mesh 26 and deentrainment mesh 30 of Mix et al U.S. Pat. No. 3,887,665; or, it may serve as an impingement type vapor-liquid separator in lieu of the cellular material 40 of Mix U.S. Pat. No. 4,105,723. Both of these patents are incorporated herein by reference. An envisioned construction of this nature is illustrated in FIGS. 6 and 7 which show a vertical column or tower 34 with cross flow trays 36 of the aperture or sieve tray type. The illustrated tray has lateral apertures and is constructed according to U.S. Pat. No. 3,463,464 which is incorporated herein by reference. Liquid is introduced to one side of each tray 36 by a downcomer 38 at one end of the tray. The liquid flows across the tray where it is subjected to the action of vapor which moves upwardly through apertures in the tray. Liquid from each tray is discharged at the opposite end of the tray over an overflow weir into the downcomer of the succeeding stage of the apparatus. In FIGS. 6 and 7, a section 40 of the packing material of FIGS. 2–5 lies on the tray, in the liqid, and another section 42 of such a packing material is spaced above the liquid to act as an impingement-type deentrainment baffle. Minute liquid droplets adhere to the baffle 42, coalesce and fall as larger drops rather than being injected with the vapor into the liquid on the next tray thereabove.

The sections 40 and 42 of packing material are formed of vertical panels which lie parallel to the horizontal liquid flow direction across the tray. The panels are oriented as shown in FIG. 2, with the linear strips 18 being horizontal so as to be parallel to the axial liquid flow direction, and the linear strips 20 being at an inclination of about 45° to the vertical. The strips 20 of adjacent panels are mutually perpendicular. It is also possible to orient the panels perpendicular or at an acute angle relative to the liquid or vapor flow directions.

FIGS. 8 and 9 show the packing in a column equipped with trays referred to in the industry as dualflow trays. "Dualflow", is a name coined by the well-known organization, Fractionation Research Incorporated, to describe perforated trays operating in a countercurrent vapor-liquid flow regime without downcomers. Proprietary devices known as Turbogrid, Ripple and Kittel trays have various types of apertures and operate by the same principles. The latter two of these are the subjects of U.S. Pat. Nos. 2,767,967 and 2,568,749 respectively which are incorporated herein by reference.

Existing dualflow type towers are comprised of a cylindrical column containing vertically spaced aperture trays with no weirs or downcomers. Liquid is introduced into the upper end of the column and vapor is introduced into the lower end of the column in quantities at pressures so that the liquid flows downwardly and the vapor flows upwardly through the same apertures in the trays. These types of devices have not heretofore been used with any packing material applied with the trays.

Dualflow type tray devices in small diameter columns have produced good efficiency and capacity results. In larger diameter columns, however, these devices have been reported to be unstable. This instability has been attributed to pressure waves which propagate laterally across the trays and are reinforced by waves reflecting from the column walls. Localized weeping and poor vapor-liquid contact are a direct result of this wave action. Dualflow trays have also been reported to give poor results in systems with high volumetric vapor/liquid ratios.

According to this invention, a packing material is located in proximity to the upper surfaces of trays of a dualflow column either on or closely above the tray. The packing material is preferably of the type shown in FIGS. 1 and 2, but it may be another known packing material such as those mentioned above in the Background of the Invention. In connection with this, it is emphasized that this is quite different from existing packed columns which have vertically spaced supports for the packing material. In existing packed columns, the projected area of the packing support is minimized, often having an open area greater then 90% of the total internal horizontal cross-sectional area of the column. In dualflow trays, however, the sieve hole area is no greater than about 40% and the optimum hole area is about 30%.

As shown in FIGS. 8 and 9, a column 50 is provided with conventional vertically spaced dualflow trays 52 which have apertures 54 providing an open area of no greater than about 40% and preferably about 30%. The column has means similar to those shown in FIG. 1 for introducing and removing the liquid and vapor, the liquid being introduced into an upper portion of the column so that substantially all of it flows gravitationally downwardly through the apertures 54 of trays 52. Vapor is introduced into the lower portion of column 50 to cause all of the vapor to flow upwardly through the same apertures the liquid is flowing through. The pressures and/or flow rates are adjusted and set at levels so that the bed of liquid on each tray will be spaced below the tray thereabove. The liquid on each tray is subjected to the action of the ascending vapor and, during this action, the liquid weeps through the tray apertures countercurrently to the ascending vapor.

A packing material 56 is placed on or near the upper surface of each tray where it is partially or fully immersed in the bed of liquid supported on the tray. The preferred packing on each tray is two sections of the material shown in FIG. 2, with their respective panels oriented in vertical planes which intersect perpendicularly. The liquid bed on each dualflow tray 52 will lie in and be stabilized by the packing 56. Lateral wave action will be suppressed, and the dualflow system will be capable of satisfactory and stable operation, even in large diameter towers. Another section 58 of the packing material, operable as a deentrainment device, may be positioned below each tray at a location above the liquid on the tray therebelow.

Persons familiar with the field of this invention will recognize that the disclosed packing material may take many forms, so it is herein emphasized that the invention is not limited only to the disclosed embodiments but is embracing of modifications thereto and improvements thereof which fall within the spirit of the following claims.

I claim:

1. Fluid contacting apparatus, comprising, a cross flow tray, a downcomer for introducing liquid at one end of the tray and an overflow weir at the other end thereof, said tray having apertures therein which enable vapor to flow upwardly through the tray into a liquid which is flowing from the downcomer to the weir, packing material lying in the liquid on the tray, said packing material comprising a stack of panels of expanded sheet material, each panel being formed of a plurality of undulating strips which are interconnected at spaced locations to form openings therebetween, each of said undulating strips including successively arranged sets of successively arranged segments, each set of segments including a first segment, a second segment, a third segment, and a fourth segment, said first segments extending across the panel in one direction, said second segments being connected to the fourth segments of an adjacent undulating strip, said third segments extending across the panel at an angle to said first segments and said fourth segments being connected to second segments of another adjacent strip, said first, second and fourth segments being generally aligned to provide on each panel a first set of parallel linear strips, said second, third and fourth segments being generally aligned to provide on each panel a second set of parallel linear strips, said panels being stacked with their first sets of linear strips extending across their respective panels in directions parallel to each other and their second sets of linear strips extending across their respective panels in directions angularly disposed to each other.

2. The packing material of claim 1 in which said first linear strips project from the faces of their respective panels to form spaced parallel ridges on opposite faces of said panels, said ridges of one panel projecting between the ridges of an adjacent panel.

3. The packing material of claim 1 in which said linear strips on adjacent panels have their surfaces canted in opposite directions relative to he planes of their respective panels.

4. The packing material of claim 1 wherein the flow direction of the liquid flowing from the downcomer to the weir lies substantially parallel to the planes of the panels.

5. The packing material of claim 1 wherein said undulating strips have their surfaces canted relative to the planes of their respective panels, adjacent said panels having their undulating strips canted in opposite directions relative to the liquid flow direction so as to deflect fluids in opposite directions laterally of the liquid flow direction.

6. The combination of claim 1 wherein said panels of the packing material are vertical and lie parallel to the path of liquid movement which extends from the downcomer to the overflow weir, adjacent said panels having their said second sets of linear strips lying perpendicular to each other and having an inclination angle of about 45°.

7. The apparatus of claim 1, wherein the apertures are oriented to introduce the vapor into the liquid in a direction which is lateral relative to the tray and substantially perpendicular to the path of liquid flowing from the downcomer to the weir, said packing material being located above the apertures such that said tray is unobstructed between adjacent apertures.

8. Fluid contacting apparatus, comprising, a cross flow tray, a downcomer for introducing liquid at one end of the tray and an overflow weir at the other end thereof, said tray having apertures therein which enable vapor to flow upwardly through the tray into a liquid which is flowing from the downcomer to the weir, packing material lying in the liquid on the tray, said packing material comprising a stack of panels of expanded sheet material, each panel being formed of a plurality of undulating strips which are interconnected at spaced locations to form openings therebetween, said openings being arranged in angularly intersecting rows, said undulating strips having segments which form two intersecting sets of parallel linear strips which extend laterally across the respective panels, said sets of strips extending at opposite inclinations between said rows of openings, a said panel having said first set of linear strips extending substantially parallel to a first set of said linear strips on the panel adjacent thereto and a second set of linear strips extending substantially perpendicular to a second set of said linear strips on the panel adjacent thereto.

9. The packing material of claim 8 in which said first set of linear strips project from the faces of their respective panels to form spaced parallel ridges on opposite faces of said panels, said ridges of one panel projecting between the ridges of an adjacent panel.

10. The packing material of claim 8 in which said linear strips on adjacent panels have their surfaces canted in opposite directions relative to the planes of their respective panels.

11. The packing material of claim 8 wherein the flow direction of the liquid flowing from the downcomer to the weir lies substantially parallel to the planes of the panels.

12. The packing material of claim 8 wherein said undulating strips have their surfaces canted relative to the planes of their respective panels, adjacent said panels having their undulating strips canted in opposite directions relative to the liquid flow direction so as to deflect fluids in opposite directions laterally of the liquid flow direction.

13. The combination of claim 8 wherein said panels of the packing material are vertical and lie parallel to the path of liquid movement which extends from the downcomer to the overflow weir, adjacent said panels having their said second sets of linear strips inclined about 45° from the vertical.

14. The apparatus of claim 8, wherein the apertures are oriented to introduce the vapor into the liquid in a direction which is lateral relative to the tray and substantially perpendicular to the path of liquid flowing from the downcomer to the weir, said packing material being located above the apertures such that said tray is unobstructed between adjacent apertures.

15. Fluid contacting apparatus, comprising, a cross flow tray, a downcomer for introducing liquid at one end of the tray and an overflow weir at the other end thereof, said tray having apertures therein which enable vapor to flow upwardly through the tray into a liquid which is flowing from the downcomer to the weir, packing material lying in the liquid on the tray, said packing material comprising a stack of vertically disposed panels of expanded sheet material, each panel being formed of a plurality of undulating strips which are interconnected at spaced locations to form openings therebetween, said openings being arranged in angularly intersecting rows, said undulating strips having segments which form two intersecting sets of parallel linear strips which extend across their respective panels, said sets of strips extending between said rows of openings, a first said panel having one set of said linear strips inclined a given angle from the vertical in one direction, and a second panel adjacent to said first panel having one set of said linear strips inclined said given angle from the vertical in an opposite direction.

16. The packing material of claim 15 in which the other said set of linear strips on each panel extends laterally thereacross substantially parallel to the other said set of linear strips of an adjacent panel.

17. The packing material of claim 16 in which the other said linear strips project from the faces of their respective panels to form spaced parallel ridges on opposite faces of said panels, said ridges of one panel projecting between the ridges of an adjacent panel.

18. The packing material of claim 15 in which said sets of linear strips on adjacent panels have their surfaces canted in opposite directions relative to the planes of their respective panels.

19. The packing material of claim 15 wherein the flow direction of the liquid flowing from the downcomer to the weir lies substantially parallel to the planes of the panels.

20. The packing material of claim 15 wherein said undulating strips have their surfaces canted relative to the planes of their respective panels, adjacent said panels having their undulating strips canted in opposite directions relative to the liquid flow direction so as to deflect fluids in opposite directions laterally of the liquid flow direction.

21. The combination of claim 15 wherein said panels of the packing material lie parallel to the path of liquid movement which extends from the downcomer to the overflow weir, said given angle of inclination of said second strips being about 45°.

22. The apparatus of claim 15, wherein the apertures are oriented to introduce the vapor into the liquid in a direction which is lateral relative to the tray and substantially perpendicular to the path of liquid flowing from the downcomer to the weir, said packing material being located above the apertures such that said tray is unobstructed between adjacent apertures.

23. Fluid contacting apparatus including packing material comprising a stack of upstanding parallel panels of expanded sheet material, means for distributing liquid onto said panels at an upper portion thereof so the liquid will flow gravitationally downwardly on said panels, means for moving a gas through the packing in an upward vertical direction which is parallel to the planes of the panels, said gas moving between the panels to contact the liquid supported on the panels, each panel being formed of a plurality of undulating strips which are connected at spaced locations to form openings therebetween, said openings being arranged in angularly intersecting rows, segments of said undulating strips forming, in each of said panels, two intersecting sets of parallel linear strips which extend laterally across their respective panels, said sets of linear strips extending at opposite inclinations between said rows of openings, a first said panel having a set of said linear strips inclined at a given angle of less than 90° from the vertical in one direction, and a second panel adjacent to said first panel having a said set of linear strips inclined at said given angle of less than 90° from the vertical in an opposite direction, said opposite inclinations of the linear strips being operable to cause the liquid on adjacent panels to flow downwardly in opposite inclined directions established by the orientation of the linear strips and wherein each of said panels has another set of linear strips extending thereacross in a direction which is substantially perpendicular to said vertical flow direction.

24. The apparatus of claim 23 in which said panels each have a said set of linear strips extending laterally thereacross in a direction which is substantially parallel to a set of linear strips of an adjacent panel.

25. The apparatus of claim 23 in which said parallel sets of linear strips project from the faces of their respective panels to form spaced parallel ridges on opposite faces of said panels, said ridges of one panel projecting between the ridges of an adjacent panel.

26. The apparatus of claim 23 in combination with an additional stack of panels as claimed, said panels in one stack being turned relative to the panels in an adjacent stack to lie in intersecting planes.

27. The apparatus of claim 23 in which said linear strips on adjacent panels have their surfaces canted in opposite directions relative to the planes of their respective panels.

28. The apparatus of claim 23 in which the given angle is about 45°.

29. The apparatus of claim 23 wherein said undulating strips have their surfaces canted relative to the planes of their respective panels, adjacent said panels having their undulating strips canted in opposite directions relative to the axial flow direction so as to deflect fluids in opposite directions relative to the planes of said panels.

* * * * *